Sept. 7, 1926.

J. B. SINDERSON

CHILD'S VEHICLE

Filed Nov. 12, 1925

1,598,788

Inventor:
John B. Sinderson
By Wilson & McCanna
Attys.

Patented Sept. 7, 1926.

1,598,788

UNITED STATES PATENT OFFICE.

JOHN B. SINDERSON, OF ROCKFORD, ILLINOIS.

CHILD'S VEHICLE.

Application filed November 12, 1925. Serial No. 68,515.

This invention relates to children's vehicles.

The principal object of the invention is to provide an improved vehicle of the coaster or scooter type, which is capable of propulsion in a novel fashion by a lateral oscillating motion of the steering handle.

Another object is the provision of improved running gear on a vehicle of the kind described which enables the continuous transmission of motive power to the rear wheels.

The invention is fully described in the course of the following specification in which reference is made to the accompanying drawing, wherein—

The same reference numerals apply to corresponding parts in the three views.

Figure 1:
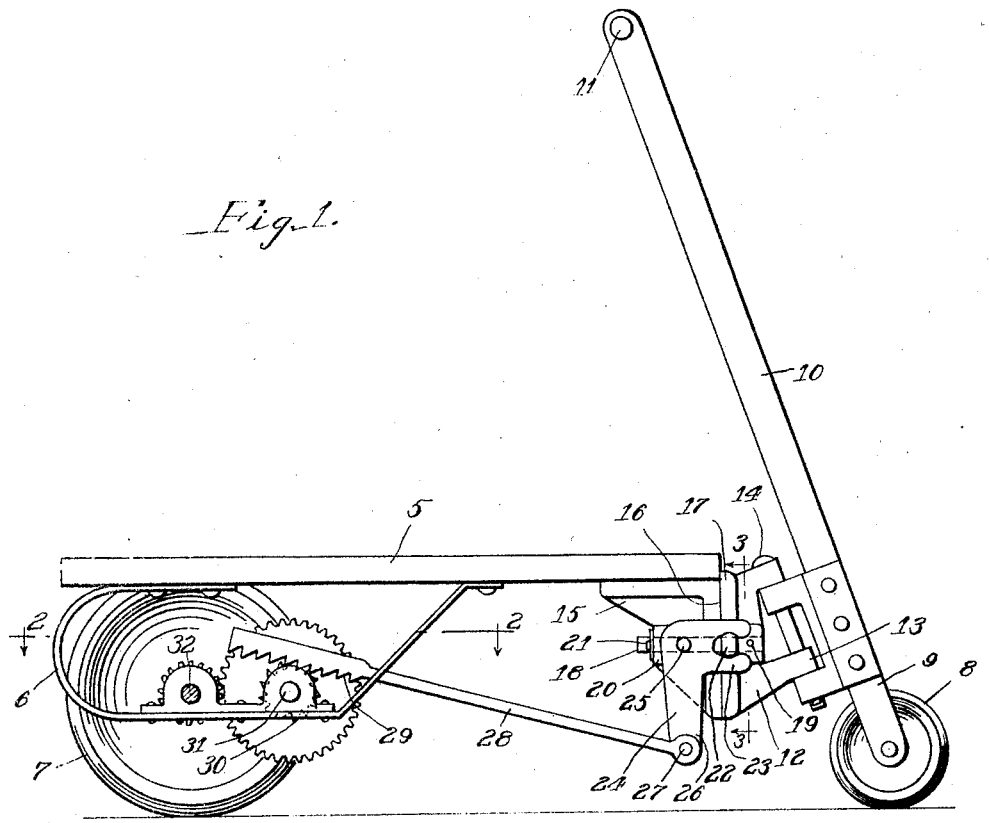
Figure 1 is a side view of a child's vehicle embodying the present invention, one of the two rear wheels being removed more clearly to disclose the running gear.
Figure 2:
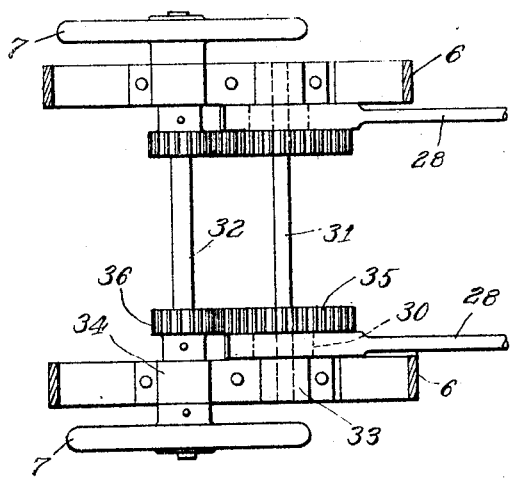
Fig. 2 is a plan view of the running gear with parts in section taken on the line 2—2 of Fig. 1.
Figure 3:
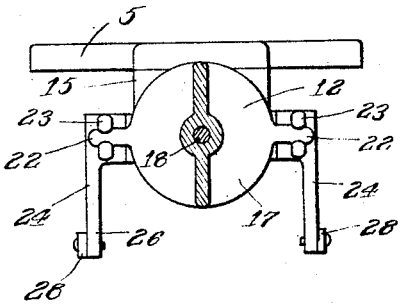
Fig. 3 is a front view of the running gear with a portion appearing in vertical section on the line 3—3 of Fig. 1.

The vehicle to which my improvements are applied comprises a foot platform 5 supported by springs 6 on a pair of rear wheels 7. A single front steering wheel 8, which is preferably relatively small in comparison to the rear wheels, operates in a fork 9 provided at the base of a steering column or handle 10. The latter may be provided with a cross bar 11 at its upper end for convenience in steering while standing on the platform 5. By means of the novel features hereinafter described the vehicle is arranged to be driven by a lateral oscillating motion of the handle 10.

The steering handle 10 is pivoted preferably in an inclined relation to the platform 5 on a bracket 12 through the intermediary of the knuckle 13 and swivel pin 14. The bracket 12 is mounted for rotative oscillation relative to a fixed bracket 15 secured on the under side of the platform 5. The bracket 15 provides a flat front vertical bearing face 16 against which a pad 17 on the bracket 12 is arranged to bear. A stub shaft 18 suitably fixed, as by means of a pin 19, in the bracket 12, is received in a bearing 20 in the bracket 15 and held against movement out of the bearing suitably by means of a cotter pin 21. The bracket 12 constitutes a yoke having laterally extending arms 22 extending into the forked ends 23 of bell crank levers 24 pivoted on studs 25 projecting from the opposite sides of the bracket 15. The forked ends 23 of the levers 24 are relatively short as compared with the depending arms 26 thereof. The latter are forked at their lower extremities and are pivoted as indicated at 27 to rods 28 extending rearwardly toward the wheels 7. From the description thus far it will appear that lateral oscillation of the steering handle 10 produces oscillation forwardly and rearwardly of the bell crank levers 24 which in turn transmit reciprocatory movement to the rods 28. It will appear that when the one rod 28 is on its forward stroke, the other rod on the other side is traveling rearwardly. Thus, when one rod is transmitting power for the driving of the rear wheels 7, the other rod is on its idle stroke and vice versa. This results in a continuous transmission of motive power for driving the vehicle.

The rods 28 are each provided with a ratchet rack 29 at the rearward ends thereof. The rack 29 normally rests upon and operates a ratchet wheel 30 fixed on a transverse jack shaft 31 arranged in front of and parallel with the rear axle shaft 32. The shafts 31 and 32 are received in bearings 33 and 34, respectively, provided suitably in the form of blocks secured to the supporting springs 6. In driving the shaft 31, each of the ratchet wheels 30 drives a spur gear 35 fixed on the shaft or made integral with the ratchet wheel. Each of the gears 35 meshes with a smaller gear 36 fixed on the rear axle shaft 32. Manifestly, a rearward stroke of either of the rods 28 communicates counterclockwise rotation to the shaft 31 as seen in Fig. 1. This rotation, through the medium of the gears 35 and 36, results in clockwise rotation of the rear axle shaft 32 and with it one of the rear wheels 7 which is fixed thereon to serve as a driving wheel. On the return or idle strokes of the rods 28, the ratchets 29 overrun the ratchet wheels 30 and, as explained above, while the one rod is traveling on its idle stroke, the other rod is in the course of its power stroke so that the rods alternately perform a driving function to give continuous transmission of motive power for driving the vehicle. The running gear is stepped up between the steering handle and the rear driving wheel to such an extent that an easy lateral oscillating motion of the steering handle is sufficient to propel the vehicle at a fairly good rate of speed. If desired, means may be provided to limit the extent of lateral oscillation.

The vehicle gives the child a novel and healthful form of exercise and enjoyment combined. The propulsion of the vehicle with a lateral movement of the steering handle requires a swaying trunk movement of the body and the rider travels in a way resembling skating as he sweeps from side to side on his course. Where a grade is encountered the vehicle will serve as a coaster since the ratchet driving gear is capable of overrunning. The use of the vehicle, it will be seen, does not require propulsion by the foot as the ordinary scooter or coaster and therefore saves wear and tear on the child's shoes.

I claim:

1. In a vehicle of the character described, a rear driving wheel, an operating handle, and means operated by lateral oscillating motion of said handle for transmitting propulsion to said rear wheel.

2. In a vehicle of the character described, a rear driving wheel, a reciprocating rod for driving the same extending forwardly therefrom, a forwardly and rearwardly oscillating lever connected therewith for operating the same, an operating handle having lateral oscillating motion, and transmission between said handle and said lever for oscillating the latter in the oscillation of the former.

3. In a vehicle of the character described, a pair of rear wheels, a pair of reciprocating rods for driving the same extending forwardly therefrom, an operating handle, a yoke oscillated laterally by oscillation of said handle, and a pair of bell crank levers having operating connections with said rods and also having operating connections with said yoke, the last mentioned connections causing forward and rearward oscillation of said bell crank levers in the lateral oscillation of said yoke.

4. In a vehicle of the character described, a pair of rear wheels, a pair of reciprocating rods for driving the same extending forwardly therefrom, an operating handle, a yoke oscillated laterally by oscillation of said handle, and a pair of bell crank levers having operating connections with said rods and also having operating connections with said yoke, the last mentioned connections causing forward and rearward oscillation of said bell crank levers in the lateral oscillation of said yoke whereby when one rod is moved forwardly the other is moved rearwardly for continuous transmission of motive power for driving said rear wheels.

5. In a vehicle of the character described, a pair of rear wheels, a pair of reciprocating rods for driving the same extending forwardly therefrom, a pair of bell crank levers having operating connections with said rods, a yoke arranged for lateral oscillating motion between said bell crank levers and having operating connections with the latter to transmit forward and rearward oscillating motion thereto, a front steering wheel, and a steering column carrying the same and pivotally mounted on said yoke arranged to be given lateral oscillating motion to oscillate said yoke.

6. In a vehicle of the character described, the combination of a foot platform, a pair of rear wheels supporting the same, a bracket fixed at the forward end of said platform providing a flat front substantially vertical bearing face, a relatively movable bracket having a complementary bearing face and having laterally projecting driving portions, a pivotal connection between the brackets providing for lateral oscillation of said movable bracket, a steering column carrying a front steering wheel and pivotally mounted on said movable bracket arranged to transmit lateral oscillation thereto in the lateral oscillating motion of said column, a pair of bell cranks pivotally mounted on said fixed bracket at opposite sides of said movable bracket and connected with the driving portions thereof whereby to be given forward and rearward oscillation in the lateral oscillation of said movable brackets, and driving connections between said bell cranks and said rear wheels.

7. In a vehicle of the character described, a driving wheel, a pair of ratchet wheels for turning the same continuously in one direction, a pair of ratchet racks operating back and forth on said ratchet wheels, and means for simultaneously and alternately advancing one rack while retarding the other on the power and idle strokes whereby to communicate a continuous driving effort to said driving wheel.

8. In a vehicle of the character described, a driving wheel, a pair of gears for driving said wheel continuously in one direction, a pair of racks for driving said gears, and means for simultaneously and alternately communicating a push to one rack and a pull on the other in their power and idle strokes.

9. In a vehicle of the character described, a pair of wheels, a driven shaft having said wheels thereon and connected with one of the same for driving purposes, a relatively small gear fixed on said shaft, a driving shaft parallel with said driven shaft, a relatively large gear fixed on said driving shaft meshing with said first mentioned gear, a pair of relatively small ratchet wheels fixed on said driving shaft, a pair of ratchet racks resting and operating on said ratchet wheels, and means for alternately pushing and pulling on said racks for driving said wheels 10. In a vehicle of the character descirbed, a pair of rear wheels, a pair of rods extending rearwardly toward said wheels, a handle operated in a lateral reciprocatory movement arranged to transmit push and pull movements alternately to said rods for continuously driving said wheels, and power transmission means between said rods and said wheels 11. In a vehicle of the character described, a frame, a rear driving wheel thereon, a steering handle pivoted to said frame for lateral oscillating motion relative thereto, said steering handle having a steering wheel mounted on the lower end thereof and being arranged to turn on an upright axis to steer the vehicle, and means operated by the lateral oscillating motion of said steering handle for transmitting propulsion to said rear wheel.

In witness of the foregoing I affix my signature.

JOHN B. SINDERSON.